US006562882B2

(12) United States Patent
Harrison

(10) Patent No.: US 6,562,882 B2
(45) Date of Patent: May 13, 2003

(54) SOIL FORMULATION FOR RESISTING EROSION

(76) Inventor: Scott Harrison, 8000 Jill Jean Ave., Bakersfield, CA (US) 93308

( * ) Notice: Subject to any disclaimer, the term of this patent is extended or adjusted under 35 U.S.C. 154(b) by 0 days.

(21) Appl. No.: 09/897,093

(22) Filed: Jun. 29, 2001

(65) Prior Publication Data

US 2003/0027891 A1 Feb. 6, 2003

(51) Int. Cl.[7] .................. C08K 17/20; C08K 17/32; C08K 17/52; C08L 1/00; C08L 33/26
(52) U.S. Cl. ................. 523/132; 524/13; 524/35; 524/831
(58) Field of Search ................. 523/132, 131; 524/13, 35, 831

(56) References Cited

U.S. PATENT DOCUMENTS

| | | | | |
|---|---|---|---|---|
| 4,071,400 A | * | 1/1978 | Jankowiak | |
| 4,669,920 A | * | 6/1987 | Dymond | |
| 5,516,830 A | * | 5/1996 | Nachtman et al. | |
| 5,779,782 A | * | 7/1998 | Spittle | |
| 5,795,377 A | * | 8/1998 | Tanner et al. | |
| 6,093,682 A | * | 7/2000 | Arendt et al. | |
| 6,360,478 B1 | * | 3/2002 | Spittle et al. | |

* cited by examiner

*Primary Examiner*—Tae H. Yoon
(74) *Attorney, Agent, or Firm*—Stetina Brunda Garred & Brucker

(57) ABSTRACT

Compositions and method for resisting soil erosion. The compositions comprise either an aqueous mixture of a polymer mixed with an organic material or, alternatively, a polymer and organic material that can be mixed in water. The polymer preferably comprises polyacrylamide having anionic functional groups and the organic base comprises either cellulose, mulch and/or seed and mulch. The methods of the present invention comprise providing or forming an aqueous mixture of the compositions of the present invention and applying them to an area of land sought to be provided with soil erosion resistance.

16 Claims, No Drawings

SOIL FORMULATION FOR RESISTING EROSION

BACKGROUND OF THE INVENTION

Soil erosion, namely, the detachment of particles of soil and surficial sediments and rocks, is a serious problem recognized worldwide. Essentially, erosion occurs via the forces of wind and water that facilitate the movement of topsoil from one place to another. Of such forces, water erosion is generally considered more detrimental to soils both by the volume of soil removed, and the area of land influenced. Moreover, although soil erosion can potentially occur in any land surface, sloping areas mantled with soil or loose sediment are particularly susceptible to such forces. Indeed, current data seems to suggest that in the United States, soil has recently been eroded at about seventeen times the rate at which it forms. Further data suggests that soil erosion rates in Asia, Africa and South America are about twice as high as that in the United States.

Due to its significance, several attempts have been made to prevent or substantially reduce soil erosion. Among the more well-known of such methods include agricultural practices, such as contour farming and terracing, no-till cultivation, strip farming and polyvarietal cultivation. Other well-known approaches include adding organic matter to soil which, by biochemical degradation, produces polysaccharides that are cohesive in nature and act to cause soil particles to stick together and resist erosion. Along these lines, products have been introduced to provide at least temporary erosion control, particularly with respect to slopes and the like until such time as trees and vegetation can take root to resist erosion. Such products include bonded fiber matrices, such as Soil Guard® produced by Mat Inc., of Floodwood, Minn., which comprises a continuous layer of elongated fiber strands held together by a water-resistant bonding agent. Such product is operative to eliminate direct raindrop impact on soil and further includes high water-holding capacity that eventually biodegrades into plant nutrients.

Such products, however, are of limited effectiveness and often do not provide the degree of soil erosion resistance as is typically desired, particularly for use in relation to man-made slopes and terraces in arid regions, such as southern California and Arizona. Such lack of effectiveness can and does often affect residential and commercial property development where man-made slopes are developed to support such structures and the like. In this regard, inadequate soil erosion resistance can culminate in the destruction of condemnation of buildings and dwellings, as well as create substantial storm water pollution. Moreover, such matrices can inhibit new plant growth by acting as a barrier against proper germination.

Accordingly, there is a substantial need in the art for a composition and method that is operative to resist soil erosion to a much greater degree than prior art compositions and methods. There is further need in the art for such compositions and methods that are non-toxic, biodegradable, can be readily deployed utilizing existing, commercially-available application techniques, and acts to serve as a soil conditioner. Still further, there is a need in the art for such a composition and method that is of simple formulation, relatively inexpensive to produce, and utilizes known, commercially-available materials.

BRIEF SUMMARY OF THE INVENTION

The present invention specifically addresses and alleviates the above-identified deficiencies in the art. In this regard, the present invention is directed to compositions and methods for eliminating or substantially reducing soil erosion. According to the preferred embodiment, the composition comprises either an aqueous mixture of an organic material, which may comprise cellulose, mulch or a combination seed and mulch and a hydrophilic polymer, the latter of which preferably comprises polyacrylamide or a mixture of polyacrylamide and sodium acrylate. Preferably, the polyacrylamide is provided with anionic functional groups. The soil erosion resisting composition may further be provided in the form of a reconstitutable powder or liquid concentrate comprised of the organic material mixed with polyacrylamide. In the latter embodiment, such composition is formulated such that the polyacrylamide is present in an amount ranging from 0.25 to 5% by weight of said composition and said organic base comprises the remaining 95.00 to 99.75% of the composition weight. To reconstitute the composition, the same is preferably mixed with water in a ratio of one pound organic base/polymer per one and one-half gallons of water to one pound organic matter/polymer to six gallons of water. In further refinements of the invention, the polymer component may comprise Earth-Guard® soil-erosion resistant products produced by Terra Novo, Inc. of Bakersfield, Calif.

As to the methods of the present invention, the same essentially comprise providing an erosion-resistant composition of the aforementioned variety and applying the same to an area of land sought to be treated to consequently resist soil erosion. According to the preferred embodiment, the method comprises forming a first admixture of water and polymer, and thereafter adding the organic material to form a second admixture. The resultant admixture may be hydraulically applied, as per conventional soil erosion resistant compositions, such as bonded fiber matrix. Advantageously, the application of the compositions of the present invention are effective immediately upon application in resisting soil erosion and are non-toxic and biodegradable. Moreover, such methods can be practiced in any kind of weather and on any kind of soil, and is especially well-suited for use on slopes and the like.

It is therefore an object of the present invention to provide compositions and methods for resisting soil erosion that can resist soil erosion to a far greater degree than prior art compositions and methods, particularly in relation to slopes and the like.

Another object of the present invention is to provide a composition and method for resisting soil erosion that is non-toxic, biodegradable and safe for the environment.

Another object of the present invention is to provide a composition and method for resisting soil erosion that is of simple formulation, relatively inexpensive, and can be readily applied utilizing conventional application equipment and techniques.

Still further objects of the invention are to provide a composition and method for resisting soil erosion that is effective immediately upon application, can be applied in any type of weather, and can be utilized on virtually any type of soil.

DETAILED DESCRIPTION OF THE INVENTION

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

The present invention is directed to compositions and methods for preventing or substantially reducing soil erosion. With regard to the compositions, there is provided the combination of a polymer and an organic material that, in use, are mixed with water to form an aqueous admixture. In this respect, the compositions of the present invention may comprise either the polymer/organic material elements alone, which may be mixed with water, or, alternatively, an aqueous solution containing such components.

With respect to the former, the polymer element comprises polyacrylamide. Such polymer, which is well-known in the art, comprises $CH_2$:$CHCONH_2$ linear polymers polymeric through the vinyl groups. Preferably, the polyacrylamide is formulated such that the functional groups thereof are anionic and, hence, converted into polyelectrolytes. It should be understood, however, that cationic functional groups are contemplated as falling within the scope of the present invention. In a more highly refined embodiment, the polymer component comprises a copolymer mixture of acrylamide and sodium acrylate, present in a ratio of approximately 70:30, that is commercially available and sold under the trademark EarthGuard® by Terra Novo, Inc. of Bakersfield, Calif. As to the organic material, the same preferably comprises either cellulose, mulch and/or seed and mulch. With respect to the latter components, the same are well-known in the art. In this regard, such component may include materials such as recycled paper mulch and/or wood fiber mulch, among several other organic materials.

The basic aforementioned components that comprise the invention, by percent weight with regard to the reconstitutable mixture, encompass the following ranges:

| COMPONENT | PERCENT BY WEIGHT |
|---|---|
| Polymer | 0.25% to 5.00% |
| Organic Material | 99.75% to 95.00% |

It is understood that the percentages of the two components above will total 100% by weight and if other materials are included in the concentrate formulation, the percentages of all ingredients will total 100% by weight.

In a more highly refined embodiment, the composition comprises the mixture of a polymer present in an amount of approximately 1.25% by weight and the organic material in an amount of 98.75% by weight. Again, to the extent additional materials are included, the percentages of all ingredients will total 100% by weight.

For application, the polymer/organic composition will be mixed with water. To that end, it is contemplated that water may be added in the amount of one and one-half to six gallons per pound of polymer/organic material. Generally, it is contemplated that a minimum application will include five hundred pounds of polymer/organic material mixed with three thousand gallons for distribution per acre. On the other hand, to the extent a maximum amount of soil erosion protection is desired, the compositions of the present invention may be applied such that one ton of polymer/organic material per three thousand gallons of water will be applied per half acre.

In further refinements of the invention which incorporate the use of EarthGuard® as the polymer component, there is set forth below in Table 1 general application rates to provide seasonal erosion control for slopes having the specified degree of inclination. Such application rates are per acre and specifically contemplate mixture with 3000 gallons of water for use on loamy soils that are balanced in organic matter and nutrients, with maximum rainfall of twelve to fifteen inches over a four to five month period.

| Slope Gradient | 6:1 | 5:1 | 4:1 | 3:1 | 2:1 | 1.5:1 | 1:1 |
|---|---|---|---|---|---|---|---|
| Gals of EarthGuard ®/Acre | 4 | 5 | 6 | 7 | 8 | 9 | 10 |
| (lbs) Mulch/Acre | 800–1,000 | 800–1,000 | 1,000–1,200 | 1,200–1,500 | 1,500–2,000 | 1,500–2,000 | 2,000–2,500 |

To the extent it is desired to impart soil erosion resistance in the spring with some rain still expected, Table 2 sets forth herebelow general rate guidelines for such applications, again contemplating per acre application with mixture with 3000 gallons of water.

1.5 gallons of water to about 1 pound of solid composition per 6 gallons of water.

| Slope Gradient | 6:1 | 5:1 | 4:1 | 3:1 | 2:1 | 1.5:1 | 1:1 |
|---|---|---|---|---|---|---|---|
| Gals of EarthGuard ®/Acre | 2 | 3 | 4 | 5 | 6 | 7 | 8 |
| (lbs) Mulch/Acre | 800–1,000 | 800–1,000 | 1,000–1,200 | 1,200–1,500 | 1,500–2,000 | 1,500–2,000 | 2,000–2,500 |

With respect to application, the same may be applied by any of a variety of techniques known in the art. For example, the compositions of the present invention may be applied via hydroseeders, among others well-known in the art. As will be appreciated by those skilled in the art, in light of the compositions of the present invention including a high amount of polyacrylamide and/or polyacrylamide and sodium acrylate, the resultant admixture produced by adding the aqueous component with the polymer/organic material will consequently produce a gel or slurry that will require constant agitation, such as through the use of agitators and the like, or by thorough mixing at the time such ingredients are in contact with one another. With respect to the latter, it is currently contemplated that the polymer component, at a minimum, must be added directly to the still water flow and thereafter the mixture is circulated for a minimum of ten minutes prior to application of the resultant admixture.

Advantageously, the compositions of the present invention are non-toxic, biodegradable and can be applied to any types of soils in any type of weather conditions. Moreover, in studies involving the aforementioned compositions, the same were shown to reduce erosion and sediment runoff by approximately 95% when compared to untreated soil conditions. As is known in the art, such reduction in sediment runoff is comparable, if not better, to the best performing best management practices known in the art. Moreover, by simply using well-known and commercially available materials, in particular the polymer component of the present invention, the compositions and methods of using the same according to the present invention are substantially more cost effective than prior art compositions and methods. Along these lines, based upon current economic analysis, it is believed that use of the compositions and methods of the present invention are anywhere from one-half to one-fifth of the cost of prior art erosion control products, namely, rolled erosion control products and bonded fiber matrices.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. An admixture formed from a solid composition and water for subsequent application to soil to prevent soil erosion comprising:
   a) a solid composition consisting essentially of an organic material and a copolymer of linear polyacrylamide and sodium acrylate, said polymer being present in an amount up to 1.25% by weight of said solid composition; and
   b) wherein said solid composition is mixed with water at a ratio of from about 1 pound of solid composition per 1.5 gallons of water to about 1 pound of solid composition per 6 gallons of water.

2. The admixture of claim 1 wherein: said copolymer is present in an amount from 0.25% to 1.25% by weight of said solid composition; and
   said organic material is present in an amount between 98.75% to 99.75% by weight of said solid composition.

3. The admixture of claim 2 wherein said sodium acrylate component of said copolymer is present in an amount from 0.075% to 0.375% by weight of said solid composition.

4. The admixture of claim 2 wherein said organic material is selected from the group consisting of cellulose, mulch, and seed combined with mulch.

5. The admixture of claim 4 wherein said mulch is selected from the group consisting of paper mulch and wood fiber mulch.

6. A method for reducing soil erosion from an area of land comprising the steps:
   a) providing a copolymer of linear polyacrylamide and sodium acrylate;
   b) providing an organic material;
   c) providing water;
   d) mixing said water in step c) with said polymer in step a) to form a first admixture;
   e) mixing the admixture of step d) with said organic matter in step b) such that the ratio of polymer to organic material is between approximately 1:400 to 1:19 by weight; and
   f) applying said admixture in step e) to said area of land.

7. The method of claim 6 wherein in step a), the ratio of linear polyacrylamide to sodium acrylate in approximately 7:3 by weight.

8. The method of claim 6 wherein in step b), said organic material is selected from the group consisting of cellulose and mulch.

9. The method of claim 8 wherein said mulch is selected from the group consisting of paper mulch and wood fiber mulch.

10. The method of claim 6 wherein in said step f) is accomplished via a hydroseeder.

11. The admixture of claim 3 wherein the ratio of linear polyacrylamide to sodium acrylate of said copolymer is approximately 7:3 by weight.

12. The method of claim 6 wherein in step e), the ratio of copolymer to organic material is approximately 1:79 by weight.

13. A method for reducing soil erosion from an area of land comprising the steps:
   a) providing a copolymer consisting of linear polyacrylamide polymer and sodium acrylate;
   b) providing an organic material selected from a group consisting of paper mulch, wood fiber mulch, and cellulose, said organic material being provided in an amount such that the ratio of copolymer in step a) to organic material is between approximately 1:400 to 1:79 by weight;

c) providing water;

d) mixing said water in step c) with said copolymer in step a) to form a first admixture;

e) mixing the admixture of step d) with said organic matter in step b) such that a second admixture is formed wherein the ratio of water to the combined weight of the copolymer and organic material ranges from approximately 500 pounds to one ton of copolymer and organic material combined per 3,000 gallons of water; and f) applying said admixture in step e) to an area of land having a size ranging from one-half acre to one acre.

14. A method for reducing soil erosion from an area of land comprising the steps:

a) providing a copolymer consisting of linear polyacrylamide polymer and sodium acrylate;

b) providing an organic material selected from a group consisting of paper mulch, wood fiber mulch, and cellulose, said organic material being provided in an amount such that the ratio of copolymer in step a) to organic material is between approximately 1:400 to 1:19 by weight;

c) providing water;

d) mixing said water in step c) with said copolymer in step a) to form a first admixture;

e) mixing the admixture of step d) with said organic matter in step b) such that a second admixture is formed wherein the ratio of water to the combined weight of the copolymer and organic material ranges from approximately 500 pounds to one ton of copolymer and organic material combined per 3,000 gallons of water; and f) applying said admixture in step e) to an area of land having a size ranging from one-half acre to one acre.

15. A method for reducing soil erosion from an area of land comprising the steps:

a) providing a linear polyacrylamide polymer;

b) providing an organic material selected from a group consisting of paper mulch, wood fiber mulch, and cellulose, said organic material being provided in an amount such that the ratio of copolymer in step a) to organic material is between approximately 1:400 to 1:19 by weight;

c) providing water;

d) mixing said water in step c) with said polymer in step a) to form a first admixture;

e) mixing the admixture of step d) with said organic matter in step b) such that a second admixture is formed wherein the ratio of water to the combined weight of the copolymer and organic material ranges from approximately 500 pounds to one ton of copolymer and organic material combined per 3,000 gallons of water; and f) applying said admixture in step e) to an area of land having a size ranging from one-half acre to one acre.

16. The method of claim 15 wherein in step b), the ratio of polymer in step a) to organic material is between approximately 1:400 to 1:79 by weight.

* * * * *